March 17, 1964 C. D. GEISLER 3,125,169
PLANTER SHOE ATTACHMENT
Filed July 24, 1963

INVENTOR
CLIFFORD D. GEISLER
BY
Donald H. Zarley
ATTORNEY

United States Patent Office 3,125,169
Patented Mar. 17, 1964

3,125,169
PLANTER SHOE ATTACHMENT
Clifford D. Geisler, Colo, Iowa
Filed July 24, 1963, Ser. No. 297,370
4 Claims. (Cl. 172—719)

Planter shoes for corn planers and the like normally have a lower runner portion which is subjected to excessive wear as the shoe passes through the soil. As this bottom runner portion becomes worn away, it is necessary for the farmer to remove the shoe from the planter and have a piece welded on to the bottom of the shoe to replace the worn away portion. This operation is expensive and consumes much of the farmer's time in addition to temporarily rendering the planter inoperative.

Therefore, it is a primary object of this invention to provide a planter shoe attachment which can be easily and quickly secured to a planter shoe to compensate for a worn away runner portion.

A further object of this invention is to provide a planter shoe attachment which will not impair the normal function of the planter after it has been placed on the planter shoe.

A still further object of this invention is to provide a planter shoe attachment which can be placed on the planter shoe without removing the shoe from the planter.

A still further object of this invention is to provide a planter shoe attachment which can be placed on a planter shoe regardless of the amount of wear to which the bottom runner portion of the shoe has been subjected.

A still further object of this invention is to provide a planter shoe attachment which can be adapted for use on a plurality of different planter shoes of varying sizes and designs.

A still further object of this invention is to provide a planter shoe attachment which is economical of manufacture, durable in use, and refined in appearance.

These and other objects will be apparent to those skilled in the art.

This invention consists in the construction, arrangements, and combination, of the various parts of the device, whereby the objects contemplated are attained as hereinafter more fully set forth, specifically pointed out in the claims, and illustrated in the accompanying drawing, in which:

Figure 1:
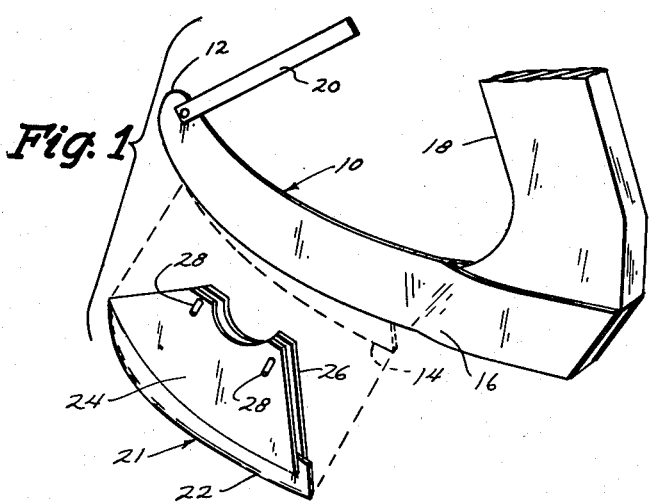
FIGURE 1 is a schematic view of the device of this invention as it is about to be placed on a worn planter shoe.

The numeral 10 generally designates a planter shoe for corn planters or the like which is generally arcuate in shape. As shown in the drawings, the forward tip 12 thereof extends upwardly and forwardly from the bottom runner portion 14 which is shown in dotted lines and which for purposes of this invention, will be regarded as being worn away through usage. The rearward heel portion 16 of planter shoe 10 is of increased thickness and is secured to the upwardly extending leg portion 18. The seeds being planted normally move downwardly through the leg portion 18 and thence through the heel portion 16 into the ground. A brace 20 normally extends from the forward tip 12 of the planter shoe up to a point of engagement with the leg portion 18.

Figure 4:
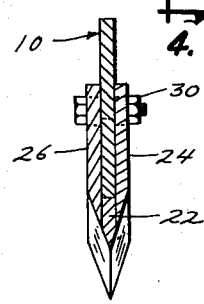
FIGURE 4 is a sectional view of the assembled components of FIGURE 3 taken on line 4—4 of that figure.
Figure 5:
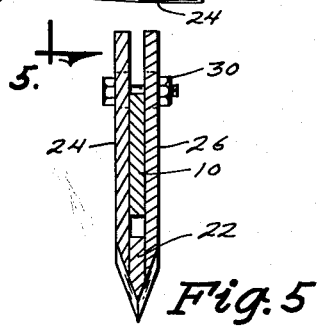
FIGURE 5 is a similar sectional view to that of FIGURE 4 but is taken on line 5—5 of FIGURE 3.

The planter shoe attachment 21 includes an arcuate bar 22 which preferably has a radius of curvature which is greater than the bottom edge of the runner portion 14 of the planter shoe. Side plates 24 and 26 are secured by their lower arcuate edges to the opposite outside sides of bar 22. This connection is affected by welding or the like. The plates 24 and 26 extend upwardly from the bar 22 in parallel fashion. Vertical slots 28 appear in aligned condition in both of the plates 24 and 26 near the upper edges thereof. Bolt and nut assemblies 30 are adapted to extend through the aligning slots 28 as will be described hereafter. As shown in FIGURES 4 and 5, the lower edges of the side plates 24 and 26, and the lower edge of the bar 22, can be tapered to a sharpened condition.

Figure 6:
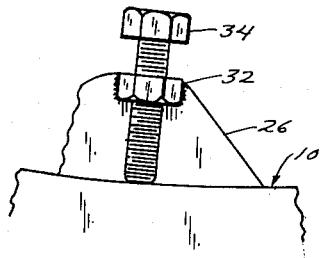
FIGURE 6 is a detail elevational view at an enlarged scale showing an alternate means for securing the planter shoe attachment to the planter shoe.
Figure 2:
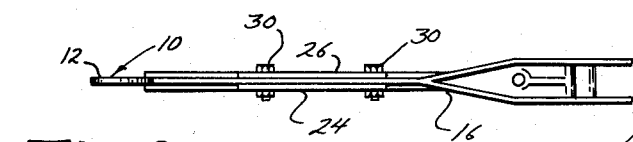
FIGURE 2 is a top view of the planter shoe of FIGURE 1 with the planter shoe attachment secured thereto.

An alternate form of the invention is shown in FIGURE 6. To replace the slots 28, nuts 32 can be welded to plates 24 and 26 in the same general position previously occupied by the slots 28. A bolt 34 can be threadably inserted through each of the nuts 32 so that the lower end of the bolt can engage the top edge of the planter shoe as will be discussed hereafter.

Figure 7:
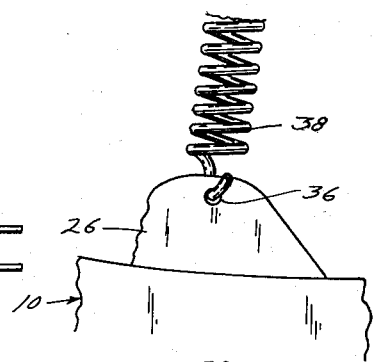
FIGURE 7 is a second alternate connecting means for securing the planter shoe attachment to the planter shoe.
Figure 3:
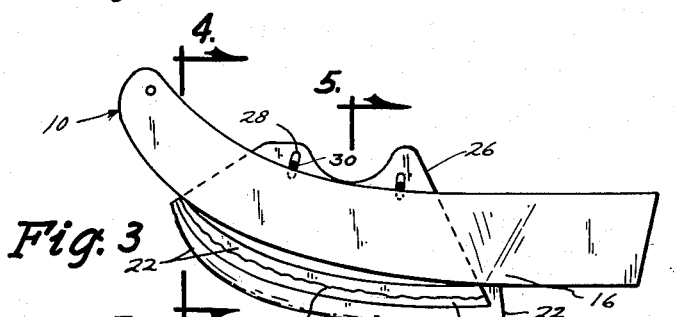
FIGURE 3 is a sectional view of the planter shoe attachment of this invention as it is mounted on a worn planter shoe.

An additional alternate form of the invention is shown in FIGURE 7. In place of the vertical slots 28 or the nuts 32, an aperture 36 can be located in plates 24 and 26 in the same general location as the slots 28 in FIGURE 3. A spring 38 can have one of its ends inserted through the aperture 36 and its other end connected to any convenient place on brace 28 or leg portion 18. The spring should be of such length that it is under tension when positioned in the above described manner, whereupon it can exert an upward vertical force on the plates 24 or 26.

The normal operation of this device is as follows: The worn planter shoe 10 is received between the parallel plates 24 and 26 with the bottom runner portion 14 thereof in engagement with at least the forward and rearward ends of bar 22. Since the curvature of the bar 22 is greater than that of the lower edge of the runner portion 14, the forward and rearward ends of the bar 22 will always be in engagement with the lower edge of the planter shoe. The shoe attachment 21 normally is moved rearwardly on the planter shoe until the rearward edges of the plates 24 and 26 engage the widened heel portion 16. The heel portion thereupon limits any further rearward movement of the shoe attachment. The above positioning of the shoe attachment takes place while the bolt and nut assemblies 30 are removed from the slots 28. After the shoe attachment has been placed in the position shown in FIGURE 3, the bolt and nut assemblies are inserted through the aligned slots 28 and are placed in engagement with the top of the planter shoe. The tightening of the bolt and nut assemblies 30 will effect a final rigid connection between the shoe attachment and the planter shoe 10. The vertical slots will permit the shoe attachment 21 to be placed on planter shoes regardless of how much or how little the planter shoe is worn.

When the device of FIGURE 6 is used, the planter shoe attachment 21 normally is inserted over the forward tip 12 of the planter shoe. The shoe attachment 21 is then moved rearwardly until the plates 24 and 26 engage the rearward heel portion 16 in the manner described above. When the plates are in the general position shown in FIGURE 3, the bolt 34 is moved into a tightened condition with the top of the planter shoe which forces the lower edge of the bottom runner portion 14 into tight engagement with the upper edge of bar 22. Similarly, the tension exerted on the planter shoe attachment 21 by the spring in FIGURE 7 will create this same tight engagement between the bar 22 and the lower edge of the bottom runner portion 14.

From the foregoing, it is seen that the device of this invention will provide a quick and easy means for compensating for worn planter shoes. As such, it is seen that the stated objectives of this invention have been met.

Some changes may be made in the construction and arrangement of my planter shoe attachment without departing from the real spirit and purpose of my invention, and it is my intention to cover by my claims, any modified forms of structure or use of mechanical equivalents which may be reasonably included within their scope.

I claim:
1. In combination,
an arcuate planter shoe having upper and lower edges, said lower edge extending from a substantially horizontal direction upwardly and forwardly in an arcuate path to the forward end of said planter shoe,
said planter shoe having a widened portion at its rearward end,
a runner attachment detachably mounted on said planter shoe,
said runner attachment including an arcuate bar having an upper edge with a smaller radius of curvature than the lower edge of said planter shoe so that the lower edge of said planter shoe will engage only the forward and rearward ends of the upper edge of said arcuate bar,
parallel spaced apart plate portions extending upwardly from said bar and extending upwardly adjacent the side edges of said planter shoe and beyond the upper edge thereof,
the lower edge of said bar having a length at least as great as the length of the lower edge of said plates,
the spaced apart distance of said plates being less than the width of the widened portion on the rearward end of said planter shoe so that the rearward edges of said plates tightly engage said widened portion to prevent any rearward movement of said runner attachment on said planter shoe,
and connecting means on the top portions of said plates above said planter shoe for detachably urging the ends of the upper edge of said arcuate bar into tight engagement with the lower edge of said planter shoe.

2. The structure of claim 1 wherein said connecting means is comprised of at least one bolt and nut-type assembly extending through aligned vertical slot openings in said plates adjacent the top edge of said planter shoe.

3. The structure of claim 1 wherein said connecting means includes a nut element secured to the upper portion of at least one of said plates, and a bolt threadably extending through said nut element to engage the top edge of said shoe to force said bar into tight engagement with the bottom edge of said shoe.

4. The structure of claim 1 wherein said connecting means includes a spring element secured to at least one of said plates so that when said spring element is placed under tension, said arcuate bar will be forced upwardly into tight engagement with the bottom edge of said shoe.

References Cited in the file of this patent
UNITED STATES PATENTS

| | | |
|---|---|---|
| 626,672 | Coulthard | June 13, 1899 |
| 966,411 | Allen | Aug. 9, 1910 |
| 1,018,105 | Flowers | Feb. 20, 1912 |
| 1,178,146 | Flowers | Apr. 4, 1916 |
| 1,488,398 | Kline | Mar. 25, 1924 |